United States Patent

Furuya et al.

[11] Patent Number: 5,556,187
[45] Date of Patent: Sep. 17, 1996

[54] VEHICULAR DISPLAY DEVICE

[75] Inventors: Yoshiyuki Furuya; Michihisa Masuda, both of Susono, Japan

[73] Assignee: Yazaki Corporation, Tokyo, Japan

[21] Appl. No.: 310,768

[22] Filed: Sep. 27, 1994

[30] Foreign Application Priority Data

Sep. 28, 1993 [JP] Japan .................... 5-241128

[51] Int. Cl.6 ............................................. G01D 11/28
[52] U.S. Cl. ........................... 362/27; 362/23; 362/247; 116/288
[58] Field of Search .................. 362/23, 26, 27, 362/28, 242, 243, 247, 298, 346; 116/288, 287, 286, DIG. 6, DIG. 26, DIG. 36, 62.1, 62.4

[56] References Cited

U.S. PATENT DOCUMENTS

| | | | |
|---|---|---|---|
| 2,900,949 | 8/1959 | Baker | 362/26 |
| 3,559,616 | 2/1971 | Protzmann | 116/288 |
| 4,215,647 | 8/1980 | Fukasawa | 116/DIG. 36 |

FOREIGN PATENT DOCUMENTS

| | | | |
|---|---|---|---|
| 0594142 | 3/1960 | Canada | 362/26 |
| 0006361 | 1/1980 | European Pat. Off. | 116/286 |

Primary Examiner—Denise L. Gromada
Assistant Examiner—Y. Quach
Attorney, Agent, or Firm—Jacobson, Price, Holman & Stern, PLLC

[57] ABSTRACT

There is provided a vehicular display device in which a dial and a pointer are made to glow by a single light source other than a cold-cathode tube to reduce costs. The vehicular display device includes a dial and a disk pointer located at an opening of the dial. A movement having a decentered rotation shaft is mounted on the rear side of the disk pointer, and five bulb light sources are arranged around the movement. A first conical reflector for reflecting and guiding light from the light sources to the disk pointer is disposed between the light sources and the movement. Furthermore, a second reflector having reflecting curved surfaces for respectively guiding light from the light sources to the first reflector is disposed outside the light sources.

4 Claims, 10 Drawing Sheets

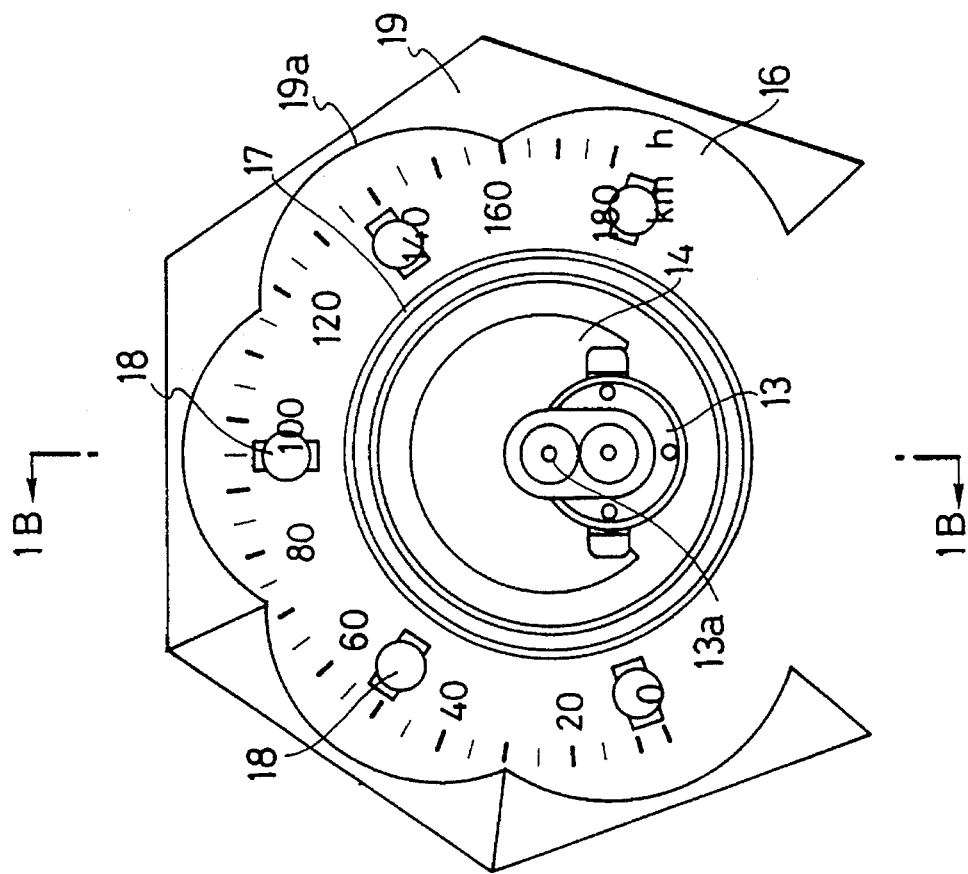
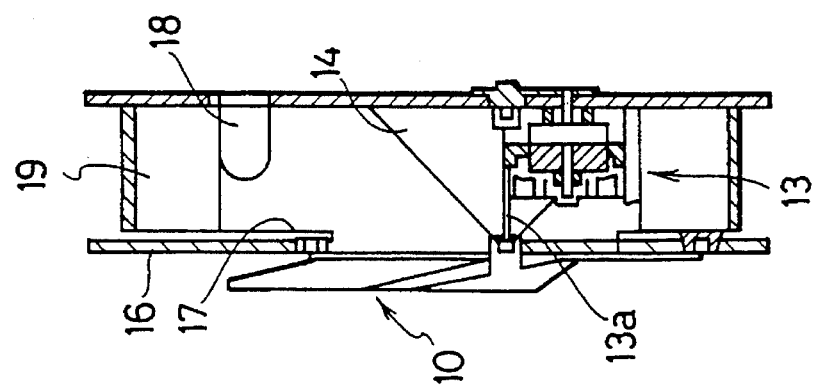

VEHICULAR DISPLAY DEVICE

BACKGROUND OF THE INVENTION

1. Field of the Invention

The present invention relates to a vehicular display device in which a display background is blackfaced, and more particularly, to a vehicular display device in which a dial and a pointer are made to glow by the same light source.

2. Description of the Related Art

Display devices, that is, meters may take a digital form or an analog form. Though a digital meter is capable of displaying minute information values, there is much need for an analog meter.

An analog meter, as is well known, makes a rotating pointer point to characters, graduations or the like on a dial, and has flexibility in its means of display, for example, the pointer and the dial can be directly or indirectly illuminated in the night by a lamp, an EL or the like to allow a clear view of the pointer and the display on the dial.

The users of analog meters on board vehicles have required brightness more suited to see the meter and more easily readable designs, that is, improvement of visibility and readability, and the realization of a new-sense display as electronics technology has recently progressed.

Therefore, attempts to improve visibility and readability are made by blackfacing a display background through the use of a dark smoke filter as a front panel of a meter to make components other than a pointer, characters and graduations hard to see and simplify display design.

Furthermore, the pointer and characters or the like on the dial are made to glow and a high-contrast display is produced on the blackfaced display background, thereby achieving new-sense display as well as improving visibility and readability.

Pointers in such blackfaced meters are classified into a self-luminous type which itself functions as a light source, and a type which is made to glow by light from a light source.

The self-luminous pointer is formed itself by a cold-cathode tube shaped like a thin stick, or provided with many LEDs on the surface thereof.

In either case, the pointer needs high rotation torque because of its heavy weight, and it is expensive. This type of meter uses a cold-cathode tube for making a dial glow, and therefore, the cost of the meter itself is high.

In consideration of this point, a disk pointer has been suggested. In a disk pointer, a rotatable disk having a slit is located at an opening formed in the center of a dial, the slit is made to glow like a pointer by irradiating the disk from behind, and the dial is also made to glow by the back light. However, it is necessary to enlarge the disk itself in order to enlarge the pointer, and the pointer and characters on the dial cannot be overlapped.

The present applicant has suggested a disk pointer and a vehicular display device using the disk pointer in Japanese Patent Application No. 5-204909 which can solve the above problems.

The disk pointer and the vehicular display device will now be described with reference to the drawings.

FIGS. 12A, 12B and 12C are respectively perspective, exploded perspective and sectional views of a disk pointer 10.

Referring to these figures, the pointer 10 consists of a disk portion 20 and a pointer portion 30. A stand 21 is attached to the back center of the disk portion 20.

A light receiving opening portion 22 is formed from the center to a peripheral edge portion 20a of the disk portion 20. The opening portion 22 is shaped so as to open from behind the stand 21 to the peripheral edge portion 20a across the stand 21.

On the other hand, the pointer portion 30 consists of a light emitting portion 32 made of a plate member, and a light guide portion 34 formed to put the light emitting portion 32 therein.

The light guide portion 34 guides incident light to the light emitting portion 32, and is, as shown in the figures, provided with a conical cylinder portion 34a whose diameter increases from the center to the peripheral edge portion 20a of the disk portion 20 and a conical cylinder portion 34b whose diameter decreases as it extends outward from the peripheral edge portion 20a. Reflection treatment such as white melamine coating is applied on the inner surface of the light guide portion 34.

An opening portion $34a_2$ is formed on a bottom portion $34a_1$ of the conical cylinder portion 34a to correspond to the light receiving opening portion 22, and a slit 34c is formed on the upper surface of the light guide portion 34 along the longitudinal center line thereof. The light emitting portion 32 is fitted into the slit 34c.

In other words, the light guide portion 34 is shaped in agreement with the shape of the light receiving opening portion 22 between the center and the peripheral edge portion 20a of the disk portion 20, and the conical cylinder portion 34b having a tapered tip is formed outward from the peripheral edge portion 20a of the disk portion 20. This is for the purpose of improving the light-collecting power and preventing the occurrence of problems when the pointer 10 overlaps with characters on a dial.

Since the light guide portion 34 is thus shaped like a conical cylinder, it can easily reflect and guide light incident from a light source 15 through the opening portion $34a_2$ to the leading end thereof.

The light emitting portion 32 is made of a fluorescent acrylic plate. When the light emitting portion 32 is fitted in the slit 34c of the light guide portion 34, its upper end is nearly flush with the surface of the conical cylinder portion 34b of the light guide portion 32 outside the peripheral edge portion 20a of the disk portion 20, and projects like a dorsal fin from the surface of the conical cylinder portion 34a of the light guide portion 34 inside the peripheral edge portion 20a of the disk portion 20.

FIG. 13 is an exploded perspective view of an actual vehicular display device using the disk pointer 10.

Referring to FIG. 13, the display device comprises a movement 13 for driving the pointer 10, a conical reflector 14 having an opening portion 14a on the top thereof, a light source 15 made of a ring-shaped cold-cathode tube, a dial 16 with a hole 16a, having almost the same diameter as that of the pointer 10, in the center thereof, and a light leakproof ring 17 fitted in the hole 16a.

The light leakproof ring 17 has a center slot formed all around its circumference, thereby making the section thereof concave. The rim-like peripheral edge portion 20a of the disk portion 20 of the pointer 10 is just fitted in the concave portion.

When the light source 15 is lighted in this state, light of the light source 15 directly, or after being reflected by the reflector 14, makes characters and graduations on the dial 16 appear. The light is also directed to the pointer 10 through the light receiving opening portion 22 of the disk portion 20, and guided into the light emitting portion 32 by the light guide portion 34, thereby making the upper end of the light emitting portion 32 glow like a pointer.

The pointer 10 rotates in correlation to the rotation of a rotation shaft of the movement 13 in response to input signals and points to characters, graduations and so on according to values of the input signals. At this time, the light leakproof ring 17 prevents the outer region of the pointer 10 from glowing in the shape of a ring and lowering visibility.

As described above, the pointer suggested by the present applicant is lightweight and has high intensity, and the vehicular display device using the pointer can achieve a wide display of the pointer. Furthermore, since the pointer and the dial can be made to glow by the same light source, the production cost can be reduced, and a suitable black-faced display device can be achieved.

Though the cost is thus reduced by using the light source common to the pointer and the dial in this vehicular display device, since the light source is made of an expensive ring-shaped cold-cathode tube, the cost is not always satisfactory.

SUMMARY OF THE INVENTION

It is an object of the present invention is to provide a vehicular display device, the manufacturing costs for which can be reduced by making the dial and the pointer glow through the use of a single light source other than a cold-cathode tube.

In order to achieve the above object, there is provided a vehicular display device which makes a dial and a pointer glow by a single bulb light source instead of a cold-cathode tube and comprises a dial having an opening in the center thereof and characters, graduations and so on around the opening, a disk pointer located at the opening of the dial, a movement located on the rear side of the disk pointer to drive the disk pointer, a plurality of bulb light sources arranged around the movement, a first reflector located between the light sources and the movement to reflect and guide light from the light sources to the disk pointer, and a second reflector located outside the light sources and having reflecting curved surfaces for respectively guiding light of the light sources to the first reflector.

According to the above construction, lights emitted from the bulb light sources first illuminates the dial in front of the light sources to make the characters and graduations appear on the dial.

Light from the light sources directly illuminating the first reflector is reflected by the first reflector and enters the disk pointer located at the opening in the center of the dial, thereby making the disk pointer glow. Light incident from the light sources on the second reflector is reflected by the reflecting curved surfaces of the second reflector to be directed to the first reflector, and, is then reflected by the first reflector to enter the disk pointer located at the opening in the center of the dial in the same manner as above, thereby making the disk pointer glow while the light is superimposed on the light directly incident on the first reflector.

According to a preferred embodiment of the present invention, each of the reflecting curved surfaces is shaped like a concave Fresnel lens.

According to another preferred embodiment of the present invention, the light sources are arranged so that a filament of each of the light sources extends almost parallel to the surface of the second reflector.

According to a further preferred embodiment of the present invention, a lens is interposed between the light source and the first reflector to condense and radiate light from the light source directly illuminating the first reflector.

BRIEF DESCRIPTION OF THE DRAWINGS

FIG. 1A is a plan view showing a first embodiment of a vehicular display device according to the present invention;

FIG. 1B is a sectional view taken along line 1B—1B in FIG. 1A;

DESCRIPTION OF THE PREFERRED EMBODIMENTS

Figure 2:
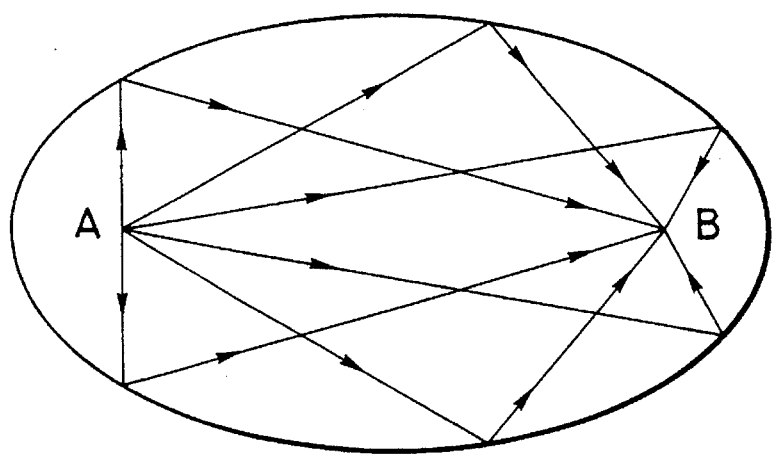
FIG. 2 is a view explaining a light reflection state of an oval reflecting surface in the vehicular display device shown in FIG. 1A.

Preferred embodiments of the vehicular display device according to the present invention will be described with reference to the attached drawings. The same or corresponding components as or to those mentioned in the description of the related art are denoted by the same numerals, and the description thereof is omitted.

FIGS. 1A and 1B illustrate a first embodiment of a vehicular display device according to the present invention. FIG. 1A is a plan view showing a state in which a disk pointer 10 and a dial 16 are taken away and only a speed display on the dial 16 is overlapped, and FIG. 1B is a sectional view showing a state in which the disk pointer 10 and the dial 16 are attached.

Referring to the figures, the vehicular display device includes the dial 16 on which characters, graduations and so on are given on the periphery thereof, and the disk pointer 10 located at an opening of the dial 16. A movement 13 having a decentered rotation shaft 13a is mounted on the rear side of the disk pointer 10, and five bulb light sources 18 are arranged around the movement 13. A first conical reflector 14 for reflecting and guiding light from the light sources 18 to the disk pointer 10 is disposed between the light sources 18 and the movement 13. Furthermore, a second reflector 19 having reflecting curved surfaces 19a for respectively guiding the light from the light sources 18 to the first reflector 14 is disposed outside the light sources 18.

In other words, this vehicular display device is different from the vehicular display device suggested before by the present applicant in that the five bulb light sources 18 are used instead of the light source made of a ring-shaped cold-cathode tube and that there is additionally mounted the second reflector 19 having the reflecting curved surfaces 19a for reflecting and guiding the light of the light sources 18 to the first reflector 14.

The light sources 18 and the second reflector 19 are positioned in consideration of the following principle.

Figure 3A:
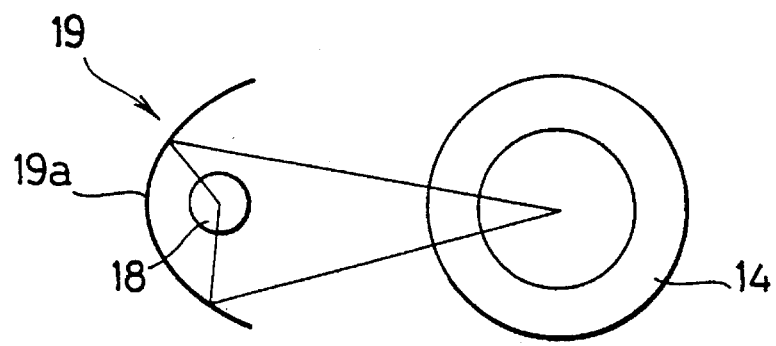
FIG. 3A is a schematic plan view of the vehicular display device shown in FIG. 1A.
Figure 3B:
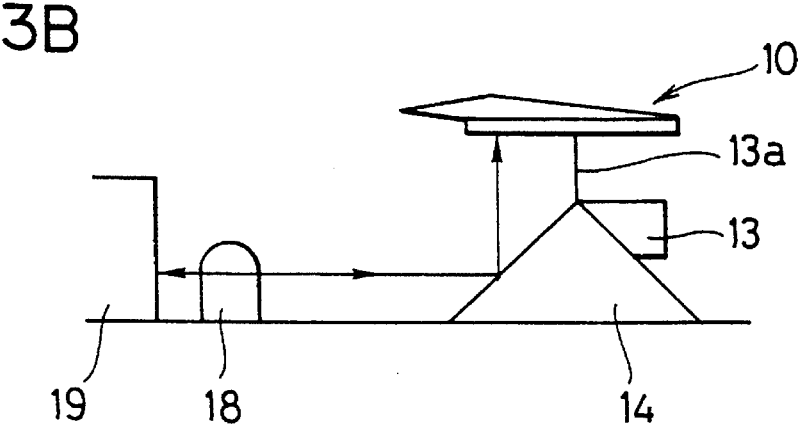
FIG. 3B is a side view of FIG. 3A.

As shown in FIG. 2, when light is emitted from one end of the major axis by using the inner surface of an oval as a reflecting surface, it is concentrated on the other end of the major axis. Based on this principle, light emitted from the light source 18 is reflected by the reflecting curved surface 19a of the second reflector 19 and concentrated onto the first reflector 14 located under the disk pointer 10, thereby forming a light ring as shown in FIG. 3A. The reflected light is made to enter the pointer 10 as shown in FIG. 3B. Reflection treatment is conducted on the reflecting curved surface 19a.

Figure 4:
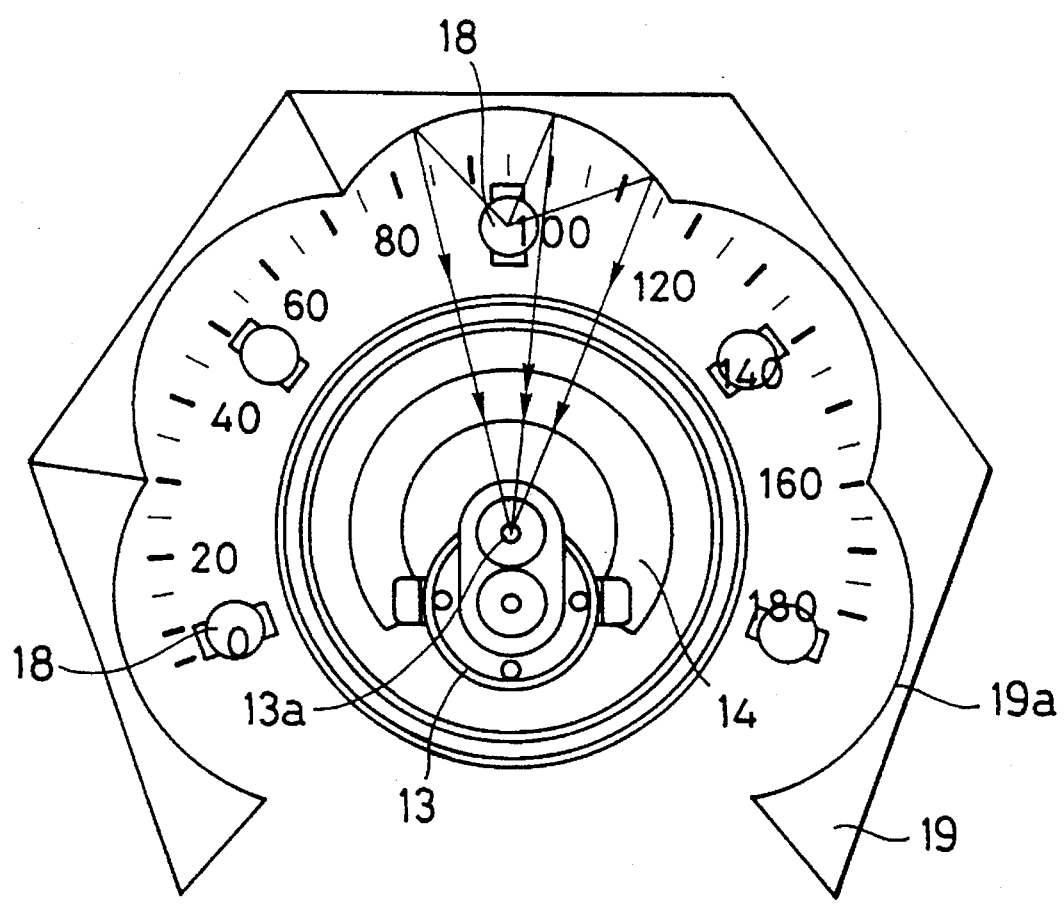
FIG. 4 is a plan view showing the optical axes of reflected light in the vehicular display device shown in FIG. 1A.

Optical axes in this case are illustrated in a plan view of FIG. 4.

It is needless to say that light directly advancing from the light source 18 to the first reflector 14 is also reflected by the first reflector 14, enters the pointer 10 and exerts the superimposition effect.

A second embodiment of the present invention will now be described.

Figure 5A:
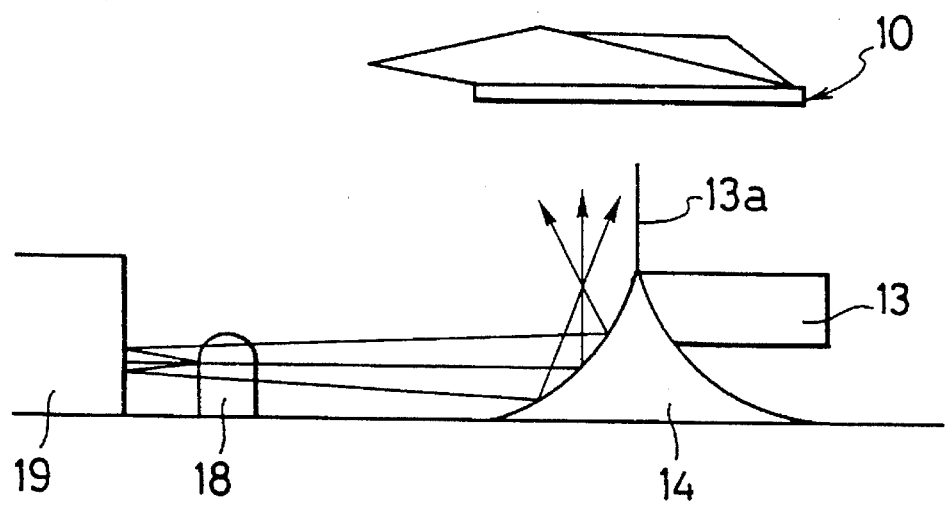
FIG. 5A is a schematic side view showing a second embodiment of a vehicular display device according to the present invention.

In the second embodiment, the reflecting surface of the first reflector 14 used in the first embodiment is formed in a concave shape as shown in FIG. 5A.

The reflecting concave surface allows a belt-like reflected light to enter the disk pointer 10 instead of the linear reflected light in the first embodiment. Therefore, the quantity of light is large.

Figure 5B:
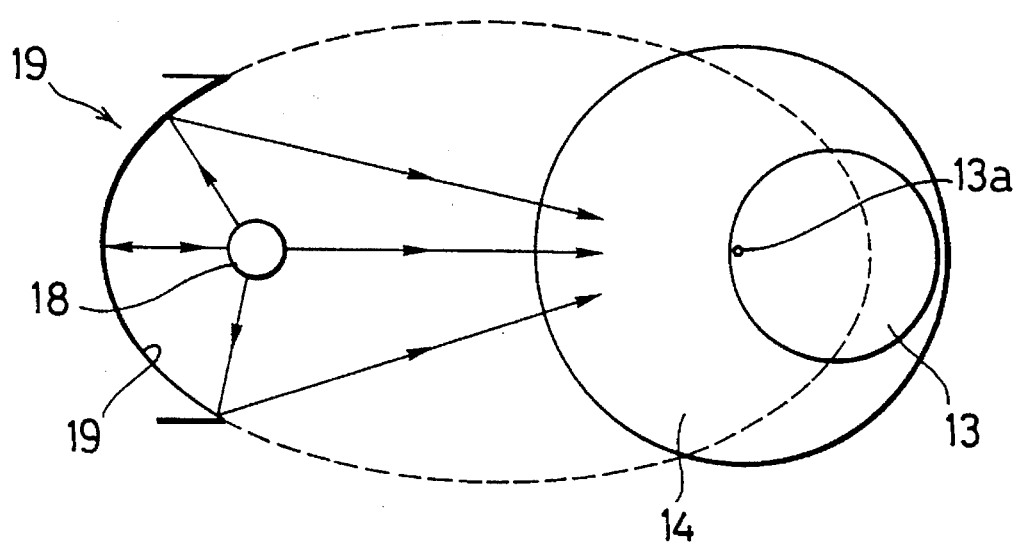
FIG. 5B is a side view of FIG. 5A.

Since the movement 13 having the decentered rotation axis 13a is used in the same manner as in the first embodiment, a wide concave reflecting surface of the first reflector 14 can be secured as shown in FIG. 5B.

Figure 6:
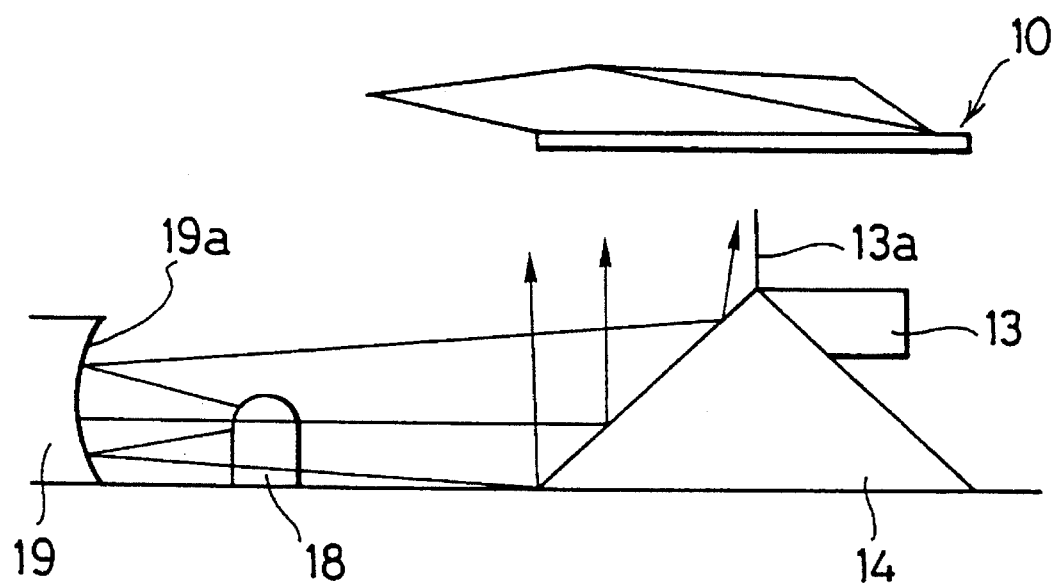
FIG. 6 is a side view showing a variation of the second embodiment of the vehicular display device according to the present invention in which the shape of a reflecting curved surface of a second reflector is changed.

If the reflecting curved surface of the second reflector 19 is also formed in a concave shape in the vertical direction as shown in FIG. 6, the same effect can be obtained.

A third embodiment of the present invention will be described.

In this embodiment, each bulb light source 18 is so located that a filament thereof extends almost parallel to the surface of the second reflector 19 in the vehicular display device in the above embodiments.

Figure 7A:
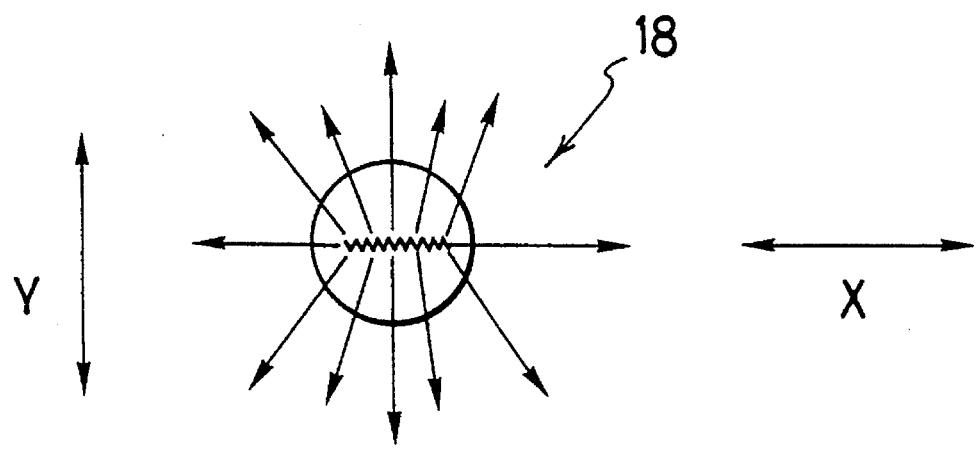
FIG. 7A is a view explaining that the light emission amount differs with the direction of a bulb light source in a third embodiment of a vehicular display device according to the present invention.

When the filament in the bulb light source 18 extends in the X direction as shown in FIG. 7A, the amount of emitted light in the Y direction is larger than that in the X direction.

Figure 7B:
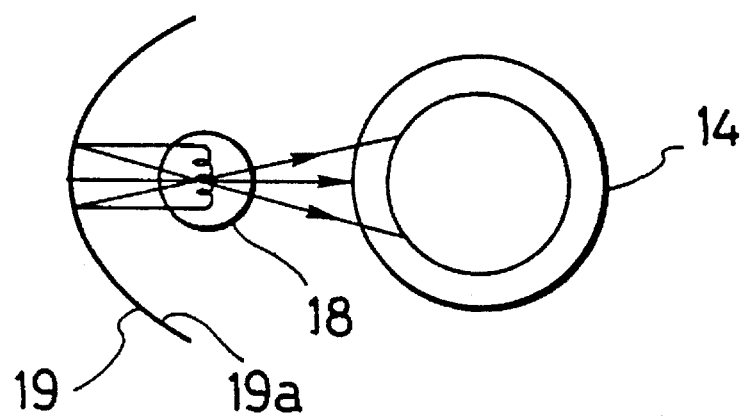
FIG. 7B is a schematic plan view showing the third embodiment of a vehicular display device according to the present invention.

The amount of light received by the first reflector 14 is increased by locating the filament almost parallel to the reflecting surface of the second reflector 19 as shown in FIG. 7B, and consequently, the amount of light received by the disk pointer 10 is also increased, resulting into the increase of luminance.

A fourth embodiment of the present invention will be described.

Figure 8:
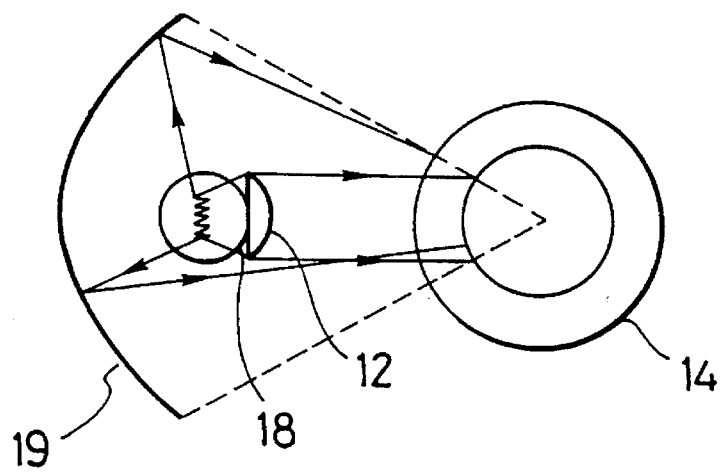
FIG. 8 is a schematic plan view showing a fourth embodiment of a vehicular display device according to the present invention.

In this embodiment, a convex lens 12 is, as shown in FIG. 8, disposed on the side of the first reflector 14 in front of the light source 18 to condense and radiate light from the light source 18 directly illuminating the first reflector 14.

The light reflected by the second reflector 19 and the light emitted from the light source 18 and concentrated by the lens 12 illuminate the same point of the first reflector 14. Therefore, it is possible to make good use of the light emitted from the light source 18 and to achieve high intensity of the disk pointer 10.

A fifth embodiment of the present invention will be described.

Figure 9:
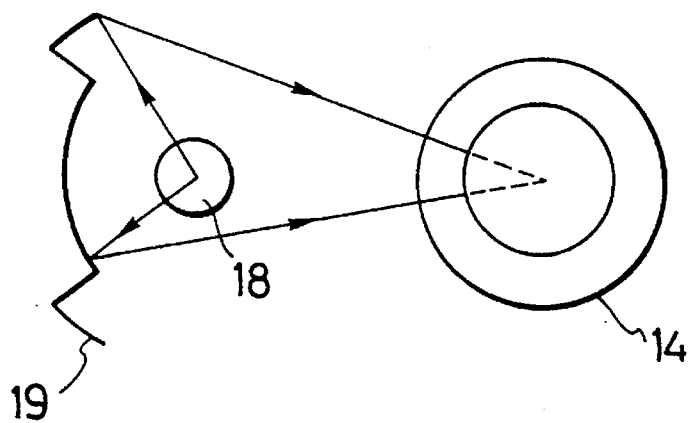
FIG. 9 is a schematic plan view showing a fifth embodiment of a vehicular display device according to the present invention.

In this embodiment, steps or indentations are formed in both ends of the reflecting curved surface 19a of the second reflector 19 as shown in FIG. 9 to concentrate light reflected by the center portion and the end portions onto the center bottom of the disk pointer 10. The reflecting curved surface 19a is formed of a reflecting surface based on the principle of the Fresnel lens.

Figure 10:
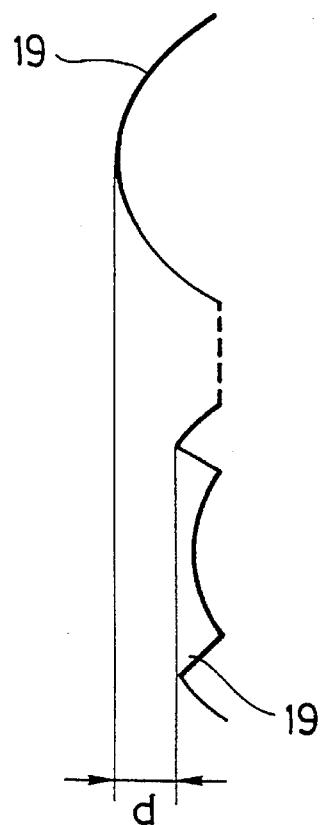
FIG. 10 is a view explaining the advantage of the vehicular display device shown in FIG. 9.

Since the reflecting curved surface 19a can be thereby thinner by d than in the first embodiment as shown in FIG. 10, the thickness of the second reflector 19 can be decreased, and the whole device can be compact.

Figure 11:
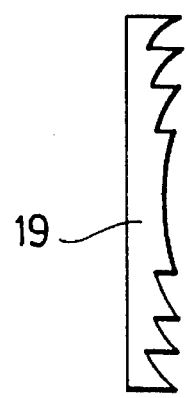
FIG. 11 is a side view showing a variation of the vehicular display device shown in FIG. 9 in which the shape of a reflecting curved surface of a second reflector is changed.
Figure 12A:
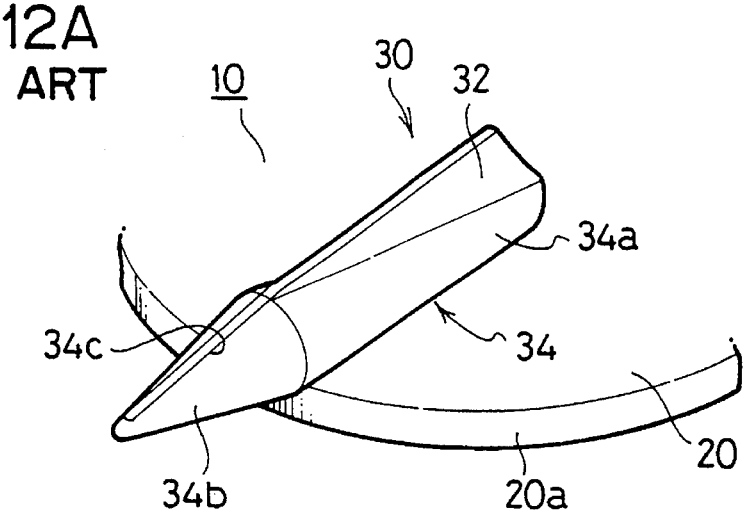
FIG. 12A is a perspective view of the above-mentioned disk pointer suggested by the present applicant.
Figure 12B:
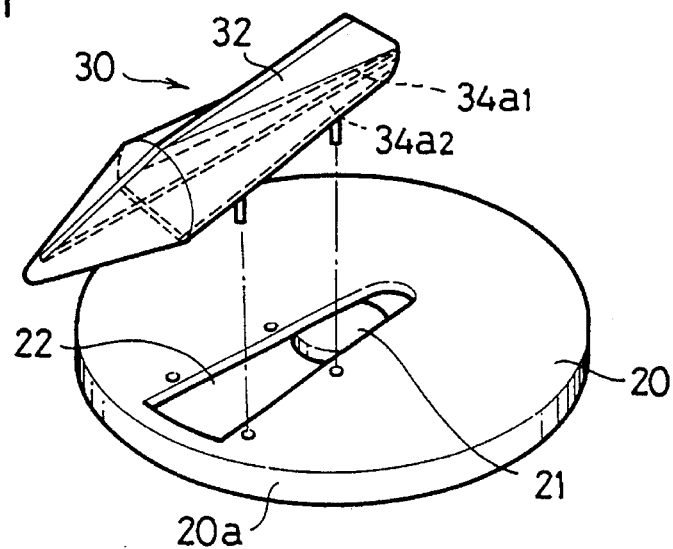
FIG. 12B is an exploded perspective view of the disk pointer shown in FIG. 12A.
Figure 12C:
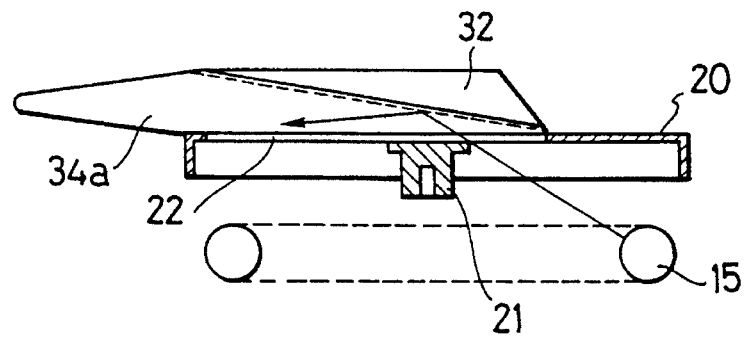
FIG. 12C is a sectional view of the disk pointer shown in FIG. 12A.
Figure 13:
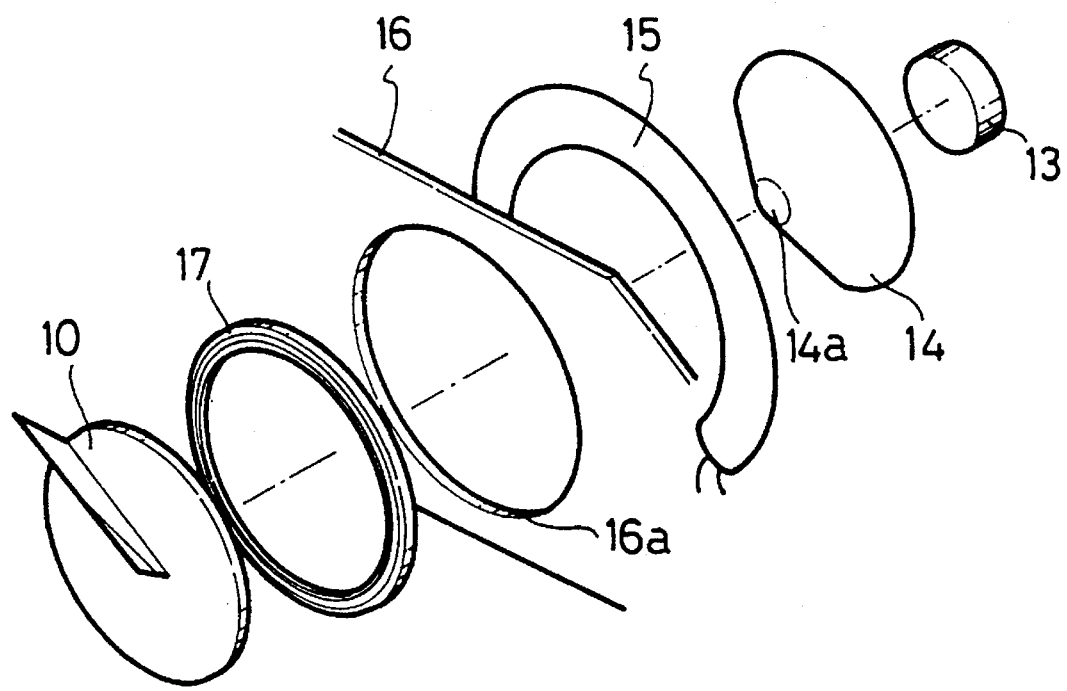
FIG. 13 is an exploded perspective view of a conventional vehicular display device using the disc pointer shown in FIG. 12A and a ring-shaped cold-cathode tube as a light source.

The second reflector 19 can be further thinned by increasing the number of steps or indentations as shown in FIG. 11.

Though five bulb light sources 18 are arranged in the above embodiments, the number of light sources is not limited to five and may be so set that luminarice does not change according to the rotating position of the disk pointer 10. The number of the reflecting curved surfaces 19a of the second reflector 19 should be increased or decreased correspondingly to the number of the light sources 18.

As described above, according to the present invention, since a bulb light source can be used instead of a cold-cathode tube in a vehicular display device which makes a dial and a pointer glow by the same light source, cost reduction can be achieved.

While the present invention has been described with reference to what are presently considered to be the preferred embodiments, it is to be understood that the invention is not limited to disclosed embodiments. To the contrary, the invention is intended to cover various modifications and equivalent arrangements included within the spirit and scope of the appended claims.

What is claimed is:

1. A vehicular display device comprising:

a dial having an opening in a center thereof and including characters around said opening on a front side thereof;

a disk pointer located at said opening of said dial;

a movement located on a rear side of said dial and disk pointer to drive said disk pointer;

a plurality of bulb light sources arranged around said movement;

a first reflector located between said light sources and said movement to reflect and guide light from said light sources to said disk pointer; and a second reflector locating outwardly of said light sources and having reflecting curved surfaces respectively guiding light of said light sources to said first reflector, each of said reflecting curved surfaces of said second reflector being made of a concave reflecting curved surface in the shape of a Fresnel lens.

2. A vehicular display device according to claim 1, wherein at least one indentation is formed at each end of each of said reflecting surface of said second reflector.

3. A vehicular display device according to claim 1, wherein the number of said bulb light sources is so set that luminance does not vary according to the rotation position of said disk pointer.

4. A vehicular display device according to claim 3, the number of said bulb light sources is five.

* * * * *